United States Patent
Padala et al.

(10) Patent No.: US 11,113,100 B2
(45) Date of Patent: Sep. 7, 2021

(54) METHOD AND A MIGRATION COMPONENT FOR MIGRATING AN APPLICATION

(71) Applicant: Telefonaktiebolaget LM Ericsson (publ), Stockholm (SE)

(72) Inventors: Chakri Padala, Bangalore (IN); Ganapathy Raman Madanagopal, Bengaluru (IN); Joao Monteiro Soares, Solna (SE); Daniel Turull, Solna (SE); Vinay Yadhav, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/642,892

(22) PCT Filed: Oct. 5, 2017

(86) PCT No.: PCT/SE2017/050974
§ 371 (c)(1),
(2) Date: Feb. 27, 2020

(87) PCT Pub. No.: WO2019/070173
PCT Pub. Date: Apr. 11, 2019

(65) Prior Publication Data
US 2020/0348966 A1    Nov. 5, 2020

(51) Int. Cl.
*G06F 9/48* (2006.01)
*G06F 9/50* (2006.01)
*G06F 12/0882* (2016.01)

(52) U.S. Cl.
CPC .......... *G06F 9/4856* (2013.01); *G06F 9/5016* (2013.01); *G06F 9/5027* (2013.01); *G06F 9/5088* (2013.01); *G06F 12/0882* (2013.01)

(58) Field of Classification Search
CPC .... G06F 9/4856; G06F 9/5016; G06F 9/5027; G06F 9/5088; G06F 12/0882
See application file for complete search history.

(56) References Cited

U.S. PATENT DOCUMENTS

| 7,640,409 | B1* | 12/2009 | Stafford | G06F 3/0647 |
| | | | | 711/162 |
| 2015/0088821 | A1* | 3/2015 | Blea | G06F 3/0619 |
| | | | | 707/624 |

(Continued)

FOREIGN PATENT DOCUMENTS

WO    2017/100281 A1    6/2017

OTHER PUBLICATIONS

Supplementary European Search Report and Search Opinion, EP App. No. 17928002.9, dated Apr. 9, 2021, 13 pages.

(Continued)

*Primary Examiner* — Sisley N Kim
(74) *Attorney, Agent, or Firm* — NDWE LLP

(57) ABSTRACT

Migrating an application executing in a source compute sled to a target compute sled. The migration component selects a first sub-set of source pages. A respective source status of each source page of the first sub-set is modified according to a source table. A target table of the target compute sled is set to indicate that a first sub-set of target pages are modified. The migration component migrates the respective content stored in the first sub-set of source pages to target pages and selects a second sub-set of source pages, wherein the respective source status of each source page of the second sub-set is modified according to the source table. The migration component sets the target table to indicate that a second sub-set of target pages is allocated in the memory and then moves the respective content stored in the second sub-set of source pages to the memory.

17 Claims, 7 Drawing Sheets

(56) References Cited

U.S. PATENT DOCUMENTS

| | | | |
|---|---|---|---|
| 2016/0026489 A1* | 1/2016 | Maislos | G06F 9/45558 718/1 |
| 2016/0030261 A1 | 2/2016 | Johnson et al. | |
| 2016/0350261 A1 | 12/2016 | Tsirkin | |
| 2017/0242590 A1 | 8/2017 | Lloyd et al. | |

OTHER PUBLICATIONS

Ericsson, "Ericsson Hyperscale Datacenter System 8000", Available Online at <https://www.ericsson.com/hyperscale/cloud-infrastructure/hyperscale-datacenter-system>, Retrieved on 2017, 6 pages.

Intel, "Intel(Registered) Rack Scale Design (Intel-Registered RSD)", Available Online at https://www.intel.in/content/www/in/en/architecture-and-technology/rack-scale-design-overview.html, Retrieved on 2017, 4 pages.

International Preliminary Report on Patentability, PCT App. No. PCT/SE2017/050974, dated Apr. 16, 2020, 7 pages.

International Search Report and Written Opinion, PCT/SE2017/050974, dated Aug. 23, 2018, 10 pages.

* cited by examiner

METHOD AND A MIGRATION COMPONENT FOR MIGRATING AN APPLICATION

CROSS-REFERENCE TO RELATED APPLICATIONS

This application is a National stage of International Application No. PCT/SE2017/050974, filed Oct. 5, 2017, which is hereby incorporated by reference.

TECHNICAL FIELD

Embodiments herein relate to computer systems, such as cloud computing systems, data centers, computer halls, hardware systems or the like. In particular, a method and a migration component for migrating an application executing in a source compute sled to a target compute sled are disclosed. A corresponding computer program and a computer program carrier are also disclosed.

BACKGROUND

Computer systems are formed by hardware and software architectures. Hardware architectures deal with how different resources, such as processing power, memory, networking interface and the like, are interconnected to, e.g. in terms of physical formats, number of wires, each other. Software architectures deal with how different programs, such as operating systems, applications, applets, virtual machines and more, are executed on the hardware architecture.

Traditional hardware architectures, used for e.g. a data center, a cloud computing system, are typically built up by a plurality of racks, such as cabinets, that are networked together. Each rack comprises one or more fully functional computers, e.g. embodied as one or more server blades. Hence, each server blade is self-contained with resources, such as processors, memory, storage units, networking interface and Input/Output (I/O) peripherals. An issue with a server blade is its static nature with regard to composition of resources. This implies that once the server blade has been assembled, processing capacity, memory capacity, network interface capacity etc. cannot be upgraded without physical intervention with the server blade, e.g. memory capacity could be upgraded by manually inserting more memory into the server blade.

In order to solve this issue, and other issues, disaggregated hardware architectures have emerged. A disaggregated hardware architecture, such as Intel Rack Scale architecture and HyperScale Datacenter Systems, separates the resources—which with the traditional hardware architecture would have been confined within one blade—that make up a hardware machine, such a server computer. The separated resources are typically organized into e.g. blades where each blade mainly includes only one of processors, memories, networking interfaces and the like. Then, a host machine can be allocated by selecting resources from one or more blades. In some cases, the disaggregated hardware system may comprise a mixture of conventional self-contained blades and blades mainly including only one of processors, memories, networking interfaces and the like.

An exemplifying known disaggregated hardware system 1 is shown in FIG. 1. The known disaggregated hardware system 1 comprises an interconnect 2, such as a superfast optical fiber connectivity. The interconnect 2 interconnects a Central Processing Unit (CPU) rack 3, a memory rack 4 and a storage rack 5. The memory rack 4 may refer to short-term memories, such as cache memory or the like, whereas the storage rack 5 may refer to long-term storage, such as hard drives, magnetic tape, etc. Here, long-term and short-term shall be considered in relation to each other. Typically, each rack comprises one or more blades. With this set up, e.g. the CPU rack 3 and the storage rack 5 will be available also during replacement of the memory rack 4, while it may be assumed that other memory racks (not shown) may support, at least during the replacement, any need of memory that the CPU rack 3 and the storage rack 5 may have. The CPU rack 3 comprises CPUs, the memory rack 4 comprises memory units, and the storage rack 5 comprises disk units, all shown as rectangles in their respective rack. A Host Machine Manager 6 handles assignment of resources, such as CPU, memory and storage, to host machines. In this example, three host machines 10, 20 and 30 and their respective resources are illustrated in the Figure.

Hence, unlike the traditional hardware architectures, where memory is very tightly coupled to one or more processors on the same sled, or in the same casing, the disaggregated hardware architecture provides a capability for a host machine to have portion of its memory in another sled. Such portion of memory is herein referred to as remote memory. The remote memory is connected to the processor using the fast interconnect. In contrast to the remote memory, the application has some further portion of its memory on the same sled as one or more processors, which executes the application. Such further portion of memory is herein referred to as local memory. In this manner, the application is allowed to scale up by attaching more remote memories to the application when needed.

In the known disaggregated hardware system, an application can be executing on a current server, using a current set of processors, which for example is hosted in a compute sled.

In a first example, the compute sled may need to be replaced or removed. In order not to cause failure and/or interruption to the application, the compute sled shall not be used by the application during replacement or removal. A problem may thus be how to ensure that the compute sled, on which the application is executing, is not used at replacement or removal.

In a second example, it may be observed that the application may use a better suited, e.g. higher/lower processing capacity etc., compute sled. Another problem may thus be how to enable adjustment of the compute sled used by the application.

In order to solve these problems, the application can be moved to a different server according to known manners, e.g. by using so called live migration of the application. The different server shall at least not be allocated with the compute sled that shall be removed or replaced. Furthermore, it can be that the different server shall be allocated with some desired compute sled that is considered to be better suited. (Hence, by a move of the application the compute sled used by the application is adjusted.)

Disadvantageously, such a move of the application from the current server to the different server requires that the application is shut-down, or at least temporarily paused.

A problem may thus be how to provide adjustment of one or more compute sleds used by an application, while at least reducing time the application is required to be paused.

SUMMARY

An object may thus be to overcome, or at least alleviate, the above mentioned problem.

According to an aspect, the object is achieved by a method, performed by a migration component, for migrating an application executing in a source compute sled to a target compute sled. The application is associated with data stored in a set of source pages of a source local memory of the source compute sled. The data comprises a respective content stored in a respective source page of the source local memory, wherein at least a portion of the data is stored in a set of target pages of a target local memory of the target compute sled when the application executes in the target compute sled after the migration of the application. A memory is capable of supporting the migration of the application. The memory is excluded from the source and target compute sleds.

The migration component selects a first sub-set of source pages, wherein a respective source status of each source page of the first sub-set is modified according to a source table of the source compute sled. The source table indicates the respective source status of each source page. The respective source status for any source page indicates that said any source page is one of modified and unmodified. The migration component sets a target table of the target compute sled to indicate that a first sub-set of target pages are modified. The first sub-set of target pages is associated with the first sub-set of source pages. The target table indicates a respective target status of each target page of the target local memory. The respective target status for any target page indicates that said any target page is one of modified and unmodified.

Furthermore, the migration component migrates the respective content stored in the first sub-set of source pages to the first sub-set of target pages. The migration component selects a second sub-set of source pages. The respective source status of each source page of the second sub-set is modified according to the source table. The first sub-set of source pages is different from the second sub-set of source pages.

Moreover, the migration component sets the target table to indicate that a second sub-set of target pages is allocated in the memory. The second sub-set of target pages is associated with the second sub-set of source pages. The first sub-set of target pages is different from the second sub-set of target pages. The migration component then moves the respective content stored in the second sub-set of source pages to the memory.

According to another aspect, the object is achieved by a migration component configured for migrating an application executing in a source compute sled to a target compute sled. The application is associated with data stored in a set of source pages of a source local memory of the source compute sled. The data comprises a respective content stored in a respective source page of the source local memory, wherein at least a portion of the data is stored in a set of target pages of a target local memory of the target compute sled when the application executes in the target compute sled after the migration of the application. A memory is capable of supporting the migration of the application. The memory is excluded from the source and target compute sleds.

The migration component is configured for selecting a first sub-set of source pages, wherein a respective source status of each source page of the first sub-set is modified according to a source table of the source compute sled. The source table indicates the respective source status of each source page. The respective source status for any source page indicates that said any source page is one of modified and unmodified. The migration component is configured for setting a target table of the target compute sled to indicate that a first sub-set of target pages are modified. The first sub-set of target pages is associated with the first sub-set of source pages. The target table indicates a respective target status of each target page of the target local memory. The respective target status for any target page indicates that said any target page is one of modified and unmodified.

Moreover, the migration component is configured for migrating the respective content stored in the first sub-set of source pages to the first sub-set of target pages. The migration component is configured for selecting a second sub-set of source pages. The respective source status of each source page of the second sub-set is modified according to the source table. The first sub-set of source pages is different from the second sub-set of source pages.

Furthermore, the migration component is configured for setting the target table to indicate that a second sub-set of target pages is allocated in the memory. The second sub-set of target pages is associated with the second sub-set of source pages. The first sub-set of target pages is different from the second sub-set of target pages. The migration component is configured for moving the respective content stored in the second sub-set of source pages to the memory.

According to further aspects, the object is achieved by a computer program and a computer program carrier corresponding to the aspects above.

Thanks to that the migration component selects the first and second sub-sets of source pages, the migration component migrates, or moves, the respective content in source pages, whose status is modified, i.e. is set to modified, to the target sled or to the memory. In this manner, the migration component reduces an amount of data that may need to be migrated to the target compute sled before the application may be resumed for execution therein. As a consequence of the reduced amount of data, a time period in which the application may need to be paused, such as frozen, shutdown or the like, may be reduced. Only a subset of pages in the source local memory may thus need to be transferred to the target compute sled. This results in large gain in migration time, or switchover time.

As an example, in one embodiment herein it is described how to do a live migration of the application's data stored on the set of source pages of the source local memory of the source compute sled to the target local memory in the target compute sled. In a disaggregated hardware system, the application may be assigned with a certain portion of memory being local and certain portion of memory being remote. The remote portion of the memory, typically stored in so called memory sleds, is shared as is and does thus not require migration. The embodiment herein describes how to handle migration of the local portion of the memory.

An advantage is, hence, that the embodiments herein enable faster migration of applications from one compute sled to another compute sled, typically being comprised in a disaggregated hardware system, such as a disaggregated memory environment or the like.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
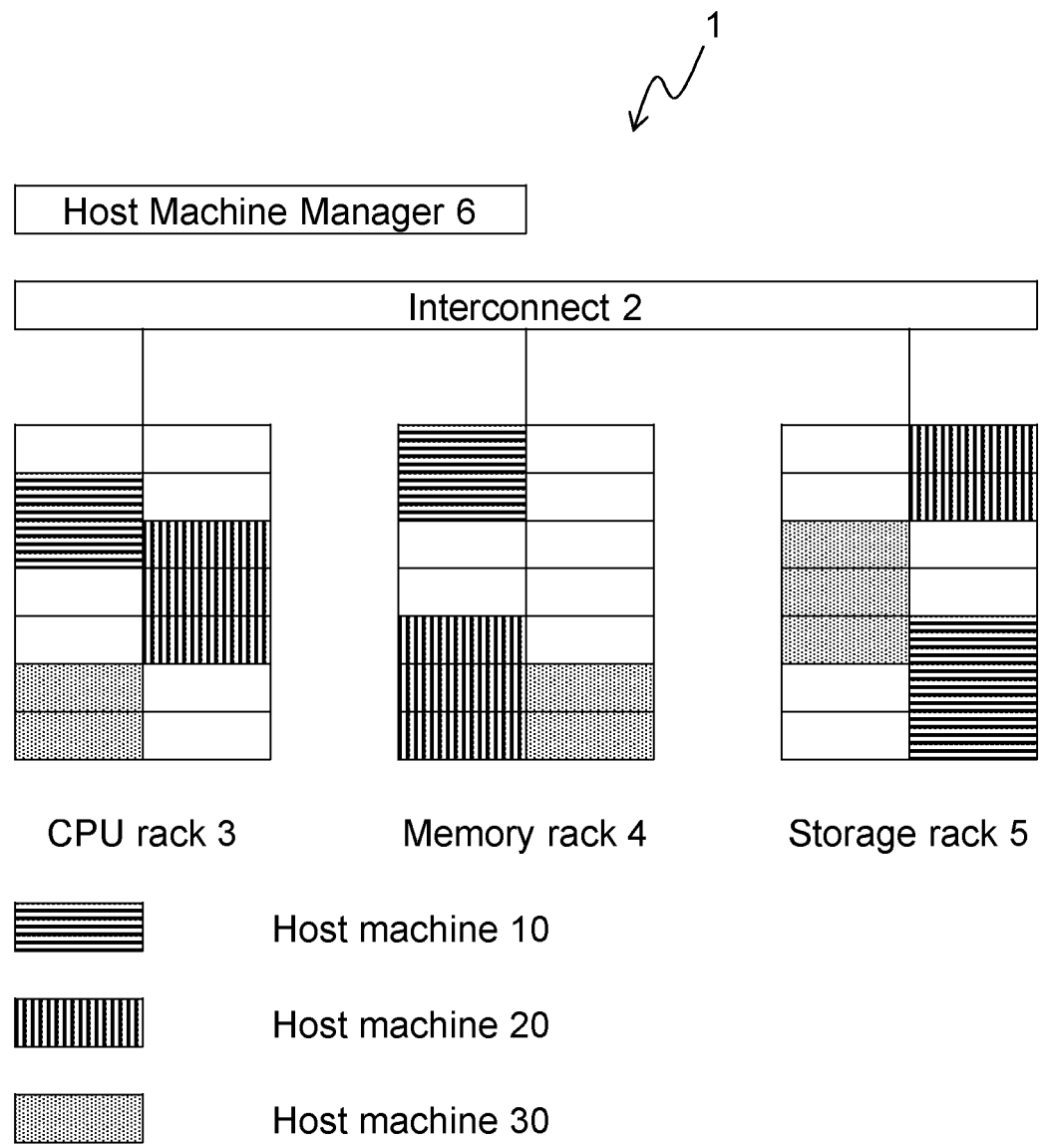
FIG. 1 is a schematic block diagram illustrating a known disaggregated hardware system.

Throughout the following description similar reference numerals have been used to denote similar features, such as nodes, actions, steps, modules, circuits, parts, items elements, units or the like, when applicable. In the Figures, features that appear in some embodiments are indicated by dashed lines.

Figure 2:
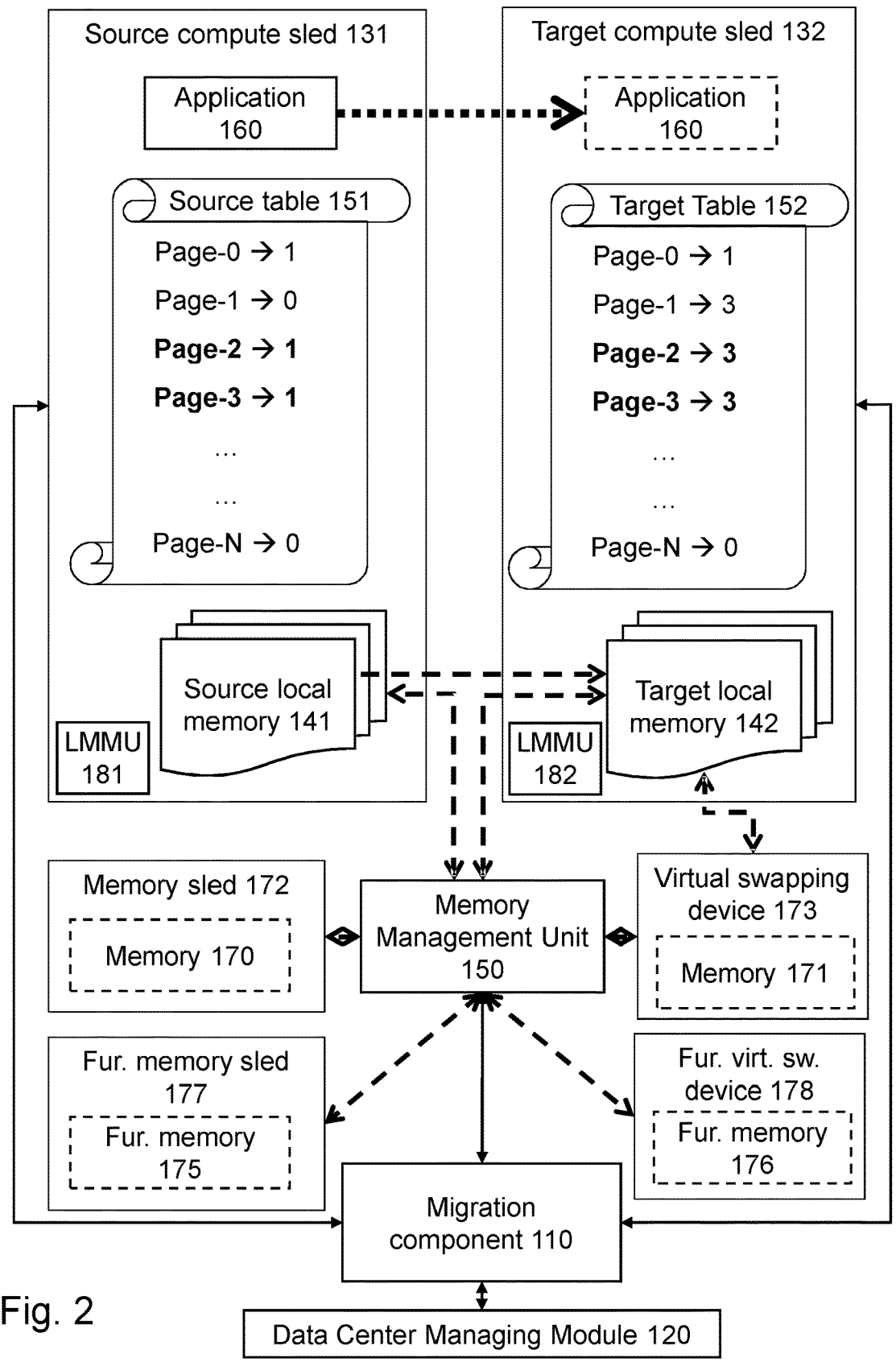
FIG. 2 is a schematic block diagram of an exemplifying hardware system in which embodiments herein may be implemented.

FIG. 2 depicts an exemplifying hardware system 100 in which embodiments herein may be implemented. The hardware system 100 may be a disaggregated hardware system.

Generally, the hardware system 100 relies on a principle of hardware resource disaggregation. The principle of hardware resource disaggregation considers CPU, memory and network resources as individual and modular entities, or resources. The resources are often organized in structures for holding such resources. Each structure may thus mainly hold only one type of resources, i.e. mainly only CPU, memory or another type of resource. As an example, the term "structure" may refer to a rack, a chassis, a blade, a sled, a closet, a cabinet or the like. For simplicity, the term "sled" is used throughout the present disclosure, but the term may be used interchangeably in related literature.

There may for instance be one or more structures for holding CPU units and one or more structures for holding memory units. The resources may also, or alternatively, be organized into many other different kinds of structures for holding resources, such as a structure for holding storage, a structure for holding network interfaces, etc. The terms "CPU structure", "memory structure" etc. will be used herein to refer to a structure for holding CPUs and a structure for holding memory units. When utilizing the hardware system 100, a host machine may be composed of a sub-set of resources within one or more structures.

In this example, the hardware system 100 may comprise, among other things, a migration component (MC) 110, such as a migration apparatus, a migration device, a migration software module residing on a dedicated or non-dedicated hardware and the like, for migrating an application 160 executing in a source compute sled 131 to a target compute sled 132. The hardware system 100 may thus comprise the source compute sled 131 and the target compute sled 132.

The application 160 may be a host machine, a virtual machine, a container, an operating system or the like.

The source compute sled 131 comprises a source local memory 141 and the target compute sled 132 comprises a target local memory 142.

The application 160 is associated with data stored in a set of source pages of the source local memory 141 of the source compute sled 131.

The data comprises a respective content stored in a respective source page of the source local memory 141. At least a portion of the data is stored in a set of target pages of a target local memory 142 of the target compute sled when the application executes in the target compute sled 132 after the migration of the application.

Should the application need to retrieve some data that does not reside in the source local memory 141, a request for said data is sent to a memory management unit 150, which e.g. keeps track of where to find said data. Said some data may for example be found in a certain memory sled (not shown) of the hardware system 100.

The source compute sled 131 may manage a source table 151. The source table 151, i.e. records of the table, indicates the respective source status of each source page. There may be one record for each source page. The respective source status for any source page indicates that said any source page is one of modified and unmodified.

Similarly, the target compute sled 132 may manage a target table 152. Hence, the target table 152, i.e. records of the table, indicates the respective target status of each target page. There may be one record for each target page. The respective target status for any target page indicates that said any target page is one of modified and unmodified.

The term "modified" may refer to that the respective contents of the source or target page is modified with respect to its corresponding copy on a page of a memory sled, e.g. a remote memory sled.

The term "unmodified" may refer to that the respective contents of the source or target page is unmodified with respect to its corresponding copy on the page of the memory sled.

The source and target tables 151, 152 may also be managed, e.g. modified, read, written etc., by the migration component 110.

A memory 170, 171 is capable of supporting the migration of the application 160. The memory 170, 171 is excluded from the source and target compute sleds 131, 132. The memory 170, 171 may be comprised in at least one of a memory sled 172 and a virtual swap device 173.

A further memory 175, 176 may be capable of supporting the migration of the application 160. The further memory 175, 176 is excluded from the source and target compute sleds 131, 132. The further memory 175, 176 may be comprised in at least one of a further memory sled 177 and a further virtual swap device 178.

According to various embodiments, the further memory 175, 176 may be the memory 170, 171, i.e. the further memory 175, 176 and the memory 170, 171 are one and the same memory. Similarly, the further memory sled 177 may be the memory sled 172. Likewise, the further virtual swap device 178 may be the virtual swap device 173.

Moreover, a data center managing module 120 may be comprised in the hardware system 100. The data center managing module 120 may perform various task relating to managing of the hardware system 100, such as detecting when it may be suitable to migrate the application 160, assignment of resources to different applications executing in the hardware system 100, starting and/or stopping of applications and more.

As used herein, the term "stored", "stored", "storing" and the like, may refer to that data and/or content is physically stored in a memory.

As used herein, term "allocated", "allocate", "allocating" and the like, may refer to that a page is allocated, i.e. is located, in a certain memory, such as a local or remote memory.

A respective Local Memory Management Unit (LMMU) 181, 182, i.e. for the source compute sled 131 and the target compute sled 132, respectively, uses the source table 151 and the target table 152, respectively, to keep track of the status of each source/target page. These tables may, for example, hold information about remote address, whether the page is different from the page in remote memory, i.e. modified or unmodified, last modification time if the page is modified.

The unmodified pages have the same content on the remote and local memory. When the need for migrating the application 160 to the target compute sled 132 arises, the Data Center Managing Module (DCM) 120 identifies the target compute sled 132 and prepares the target pages in the target compute sled 132. The DCM 120 may also create the target table 152.

As an overview, the follow description is provided to present an example of a method performed by the migration component 110. The migration component 110 may handle migration of the contents of the pages from the source local memory 141 to the target local memory 142. The migration component 110 may copy the source table from the source compute sled 131 to the target table 152 of the target compute sled 132 and may perform one or more of the following actions in order to transfer the contents of the source pages:

- mark some of the modified pages as swapped out to a memory, such as a special swap device. This device is then used to fetch content of those pages from the source sled 131 on demand, e.g. as requested by the target compute sled 132 and/or the memory management unit 150. See also action B050 and/or B060 below.
- flush some of the modified pages to the memory sled 172 and/or the further memory sled 177 to reduce time the source compute sled 131 may need to be kept alive, e.g. due to the source local memory 141 includes data/content that has not yet been migrated to e.g. the target local memory 142 and/or any other memory that is operational/usable independent of whether or not the source compute sled 131 is switched on, i.e. up and running. Again, see action B050 and/or B060 below.
- mark some of the unmodified pages (which may be infrequently used) as swapped out to remote memory, i.e. the migration component 110 may set status of some target pages to unknown which leads to that these unmodified pages need not be migrated to the target local memory 142. See also action B080 and/or action B100 below.
- adjust, such as reduce, increase, set of the like, size of target table and/or size of target pages of the target local memory 142, where size of table relates to number of target pages and size of target pages relates to amount of data that can be stored on each target page, wherein the adjustment may be based on an amount of available target local memory.

When a certain amount of data/content memory has been migrated, the target compute sled may be allowed to host execution of the application 160. While the application 160 executes in the target compute sled 132, the migration component 110 may continue, i.e. in the background, to transfer data/content of source pages. Should there be a so called page fault when the application 160 executes in the target compute sled 132 (due to that some requested data/content has not yet been transferred), the data/content of the faulty page may be transferred from the memory 170, 171 and/or from the source local memory 141 dynamically, e.g. on demand. The migration component 110 may also transfers the data/content of these faulty pages in the background.

In this manner, e.g. maintenance personnel—taking care of the hardware system 100—may be able to put a certain compute sled, such as the source compute sled 131, out of operation e.g. for maintenance purposes without losing any data stored in the certain compute sled.

Furthermore, the embodiments herein enable migration of the application 160 to a compute sled, such as the target compute sled 132, which may be located near any existing remote memory associated with the application 160, where remote memory may refer to memory comprised in any memory sled of the hardware system 100, such as the memory sled 172, the further memory sled 177 or the like. In this manner, performance of the application may be improved, e.g. shorter delays, response time etc. for retrieving data from said any remote memory may be achieved.

It may be noted that the local target memory 142 does not need to be of the same size or bigger than the source local memory 141. Use of the virtual swap device 173 and/or remote memory, such as the memory 170 and/or the further memory 175, may allow for flexibility in terms of sizes of the local memories, such as the source and/or target local memories 141, 142. That is to say, in case the target local memory 142 is smaller than the source local memory 141, a larger portion of a total amount of data/content associated with the application 160 may on average reside in the remote memory as compared to prior migration of the application 160 to the target compute sled 142.

Local Memory Management Unit: LMMU is present in the sled where the application is running. When the application accesses the virtual address, LMMU fetches the corresponding page from the local memory. Page access from the local or remote memory is opaque to the application and Local and Global Memory Management unit together provides this abstraction.

Source and target tables: These tables comprises meta-information of all the pages in the local memory, preferably on a per application basis, i.e. whether the page resides in local or remote memory, remote address corresponding to a page, whether a page is modified or not. The table is updated with the following information for all the local pages based on the status of each page.

UNMODIFIED→data same as in a correspond remote memory page, i.e. in a remote memory sled.

MODIFIED→Page is dirty/modified. The local page is different from the remote page UNKNOWN→This status is only set in the target table to prepare for migration. When the status is unknown, it means that the information may need to be retrieved from the source compute sled and/or a remote memory sled and/or by means of a virtual swap device. UNMODIFIED, MODIFIED and UNKNOWN may correspond to e.g. 1, 2 and 3 or any other suitable values.

New Master Page: This page is created during the local memory migration and contains the meta-information of all the pages in local memory that belongs to an application. When the migration is initiated, the contents from the Existing Master Page are copied into the New Master Page. Also, if the target local memory is different in size (specifically less) from the existing local memory, the target table is also updated with the information whether the migrated page resides in local memory/remote memory/virtual device.

Data Center Managing module: This is a central entity that assigns, monitors and control the memory that belongs to an application. It also identifies and prepares a new suitable compute sled, i.e. the target compute sled 131, for migrating the application.

Migration component (MC): The role of this entity is to schedule and migrate the contents of all the pages from the source local memory location to the target local memory in the target compute sled. The migration component is initiated by the DCM. When the contents from the source local memory pages are copied into the pages in the target local memory in background or on demand. The status of corresponding copied page is also update into the target table by the migration component.

Virtual swap device: It is created in the hypervisor for marking some of the modified pages as swapped out. This device is then used to fetch memory from source sled on demand. This reduces the need of modifying the Operating system, since the interface toward the operating system already exists today.

Figure 3:
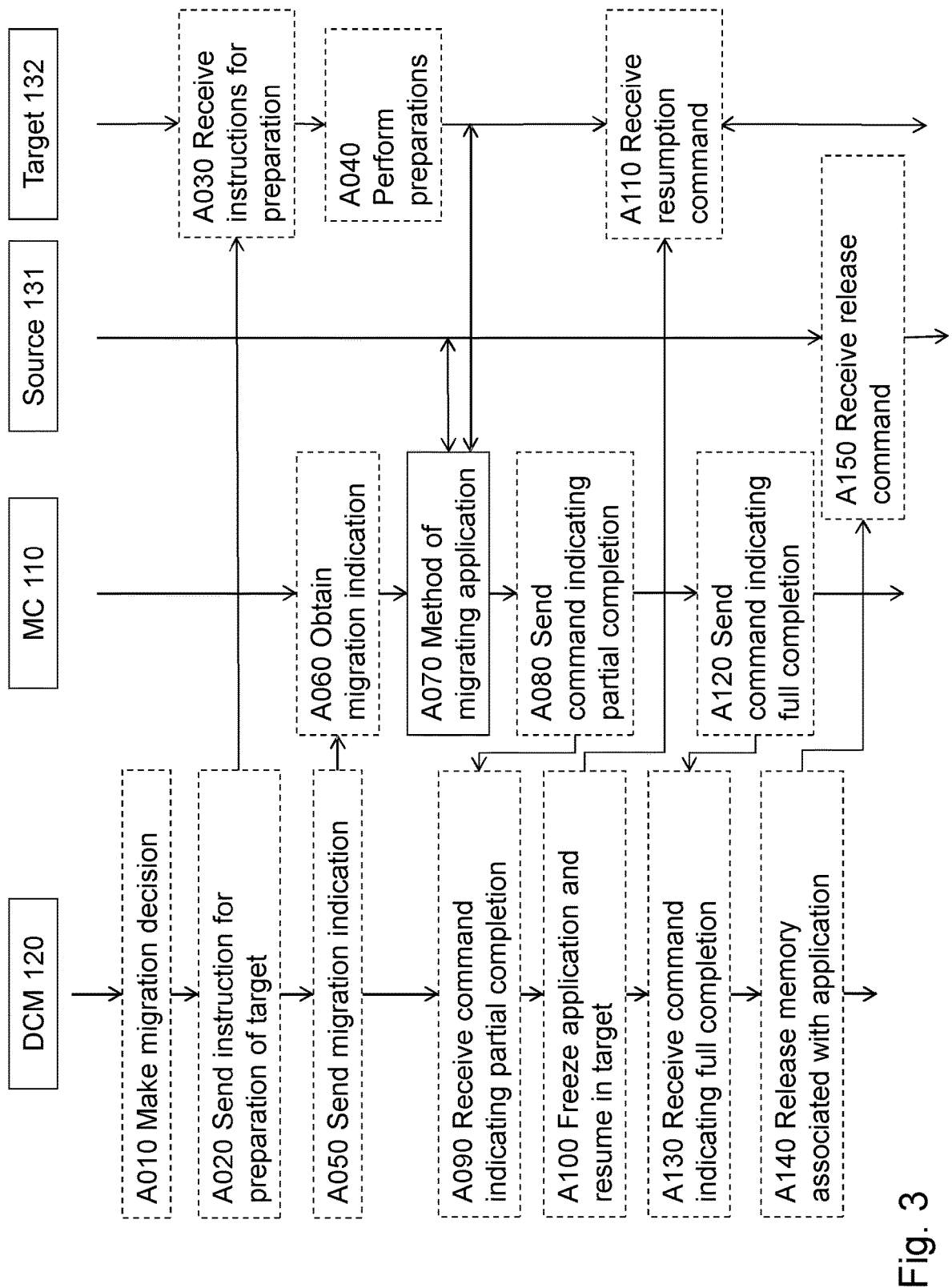
FIG. 3 is a combined signaling and flowchart illustrating embodiments of the method in the migration component.

FIG. 3 illustrates an exemplifying scenario relating to the hardware system 100 of FIG. 2. The embodiments herein may provide certain benefits and/or advantages in this scenario as described herein.

One or more of the following actions may be performed in any suitable order.

Action A010

The DCM 120 may make a decision to migrate the application, e.g. from the source compute sled 131 to the target compute sled 132.

Action A020

Subsequent to action A010, The DCM 120 may send, to the target compute sled 132, instructions for preparation of the target compute sled 132.

Action A030

As a result of action A020, the target compute sled 132 may receive the instructions for preparation of the target compute sled 132.

Action A040

The target compute sled 132 may perform preparations according to the instructions for preparation. E.g. the target compute sled 132 may create the target table 152, which may be designated to the application 160. In other examples, there is one table for all applications that may execute in the target compute sled 132. Hence, it may be that the target compute sled 132 need not create the target table in case it already exists.

Action A050

The DCM 120 may send a migration indication to the migration component 110. The migration indication may include information about the source and target compute sleds 131, 132, such as identification, address or the like.

Action A060

Subsequent to action A050, the migration component 110 may obtain, such as receive, fetch or the like, the migration indication.

Action A070

The migration component 110 may perform a method for migrating the application 160 executing in the source compute sled 131 to the target compute sled 132 as described in more detail with reference to FIG. 4.

Action A080

When a certain amount, or a certain portion, of the data associated with the application 160 has been migrated, the migration component 110 may send a command indicating partial completion of the migration to the data center managing module 120.

Action A090

Subsequent to action A080, the DCM 120 may receive the command indicating partial completion of the migration from the migration component 110. In this manner, the DCM 120 may be notified about that the application 160 may be paused in the source compute sled 131 and resumed in the target compute sled 132.

Action A100

Hence, following reception of the command, the DCM 120 may pause the application 160 in the source compute sled 131 and resume the application 160 in the target compute sled 132. As an example, the DCM 120 may send a resumption command to the target compute sled 132 in order to cause resumption of the application 160 in the target compute sled 132.

In some example, the migration component 110 may send the instruction to the target compute sled 132 in order to resume the application 160 therein.

Action A110

Accordingly, in some examples, the target compute sled 132 may receive the resumption command, in response to which execution of the application 160 in the target compute sled 132 is resumed.

Action A120

Possibly simultaneously, or in parallel, with the actions above, the migration component 110 may continue to execute the method of migrating the application 160. At some point, the application 160 may be considered to be fully, or completely, migrated. Therefore, the migration component 110 may send a command indicating full completion of the migration to the DCM 120.

Action A130

Subsequent to action A120, the DCM 120 may thus receive the command indicating full completion from the migration component 110.

Action A140

In response to action A130, the DCM 120 may release any memory that prior to the migration of the application 160 was occupied by data/content associated with the application 160. Said any memory, or pages, may then be used by other applications, unless the source compute sled 131 shall be shut down for maintenance purposes or the like. As an example, the DCM 120 may send a release command indication that any memory previously used by the application 160 may now be released. In some examples, the migration component 110 may send the release command to the source compute sled 131 and/or a further command instructing the source compute sled 131 to shut down.

Action A150

Accordingly, the source compute sled 131 may in some examples receive the release command and act accordingly.

Figure 4:
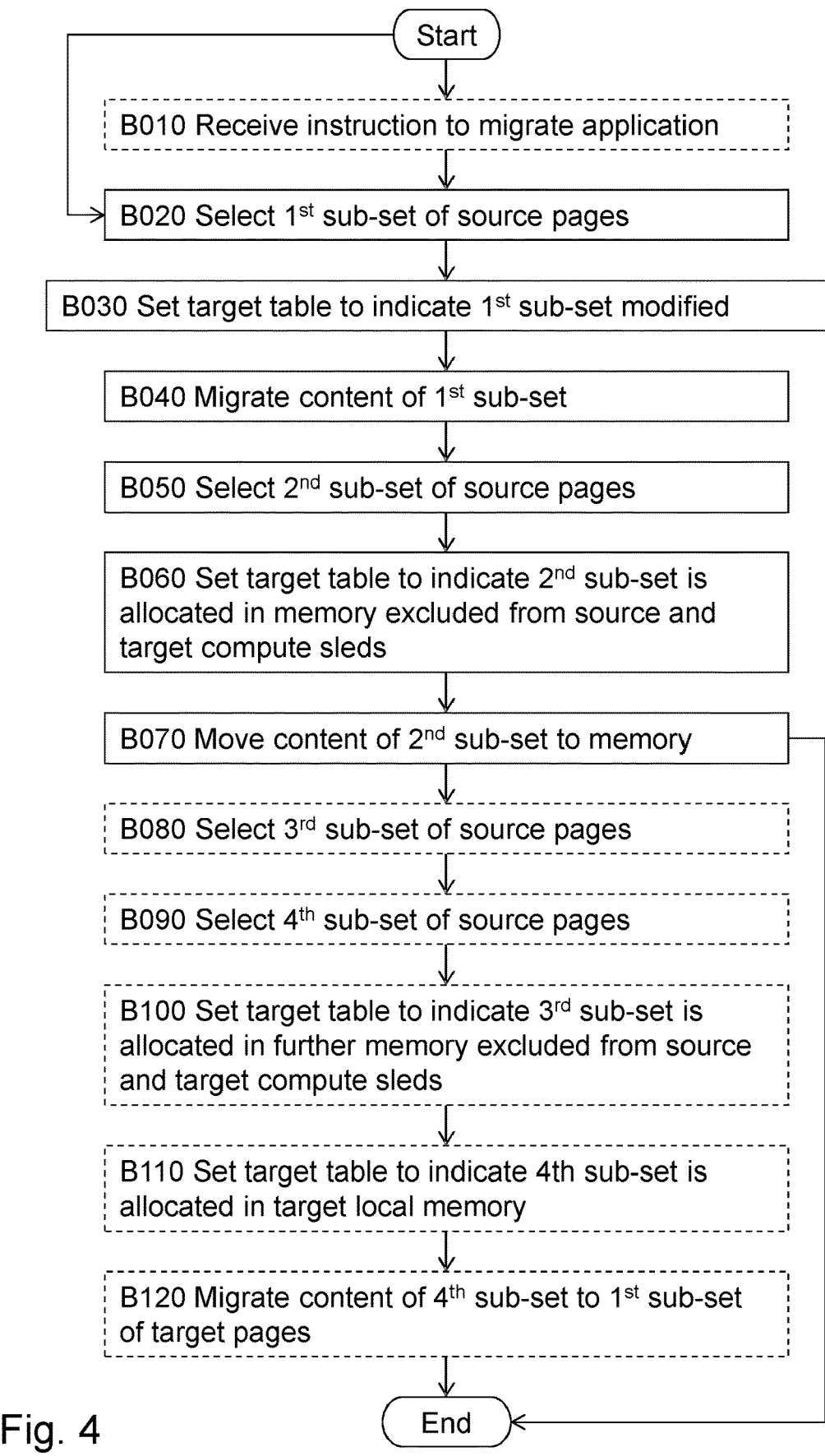
FIG. 4 is an exemplifying flowchart illustrating embodiments of the method in the migration component.

In FIG. 4, a schematic flowchart of exemplifying methods in the migration component 110 is shown. The majority of the actions in this flowchart describes action A070 of FIG. 3 in more detail. Accordingly, the migration component 110 performs a method for migrating the application 160 executing in the source compute sled 131 to the target compute sled 132.

As mentioned, the application is associated with data stored in the set of source pages of the source local memory 141 of the source compute sled 131.

The data comprises a respective content stored in a respective source page of the source local memory 141, wherein at least a portion of the data is stored in a set of target pages of the target local memory 142 of the target compute sled when the application executes in the target compute sled 132 after the migration of the application.

Again, the memory 170, 171 is capable of supporting the migration of the application 160. The memory 170, 171 is excluded from the source and target compute sleds 131, 132.

One or more of the following actions may be performed in any suitable order.

Action B010

The migration component 110 may receive an instruction from a data center managing module 120 to migrate the application to the target compute sled 132. This action is similar to action A060 of FIG. 3.

Action B020

The migration component 110 selects a first sub-set of source pages, wherein a respective source status of each source page of the first sub-set is modified according to a source table 151 of the source compute sled 131. The source table 151 indicates the respective source status of each source page. The respective source status for any source page indicates that said any source page is one of modified and unmodified.

Action B030

The migration component 110 sets a target table 152 of the target compute sled 132 to indicate that a first sub-set of target pages are modified. The first sub-set of target pages is associated with the first sub-set of source pages. The target table indicates a respective target status of each target page of the target local memory. The respective target status for any target page indicates that said any target page is one of modified and unmodified.

Action B040

Furthermore, the migration component 110 migrates the respective content stored in the first sub-set of source pages to the first sub-set of target pages.

Action B050

The migration component 110 selects a second sub-set of source pages. The respective source status of each source page of the second sub-set is modified according to the source table 151. The first sub-set of source pages is different from the second sub-set of source pages.

In view of actions B020 and/or B050, each source page may in some embodiments have a respective utility indication relating to at least one of access frequency, time stamp of latest access to said each source page, latency and memory type, wherein a set of utility indications may comprises the respective utility indication for each source page.

With these embodiments, the selecting of the first sub-set of source pages may be based on the set of utility indications, and/or the selecting of the second sub-set of source pages is based on the set of utility indications, and/or the selecting of the third sub-set of source pages is based on the set of utility indications, and/or the selecting of the fourth sub-set of source pages is based on the set of utility indications.

In some further embodiments, the selecting of the first sub-set of source pages may be performed randomly. In this manner, time of migration may be reduced.

Action B060

Moreover, the migration component 110 sets the target table 152 to indicate that a second sub-set of target pages is allocated in the memory 170, 171, wherein the second sub-set of target pages is associated with the second sub-set of source pages. The first sub-set of target pages is different from the second sub-set of target pages.

As an example, when the migration component 110 sets the target table 152 an entry of the target table 152 may be updated, or set to a value indicating that the respective contents of that target page is allocated in the memory 170, 171. Expressed differently, the migration component 110 may update a corresponding entry in the target table to indicate that the corresponding page is stored in the memory 170, 171 and possibly provide a remote address to the memory 170m 171.

In one example, the setting of the target table to indicate that the second sub-set is allocated in the memory may comprise setting the target table to indicate that the second sub-set is allocated in the remote memory, i.e. the memory 170 is comprised in the memory sled 172.

In another example, the setting of the target table to indicate that the second sub-set is allocated in the memory may comprise setting the target table to indicate that the second sub-set is allocated in the virtual swap device.

Action B070

The migration component 110 then moves the respective content stored in the second sub-set of source pages to the memory 170, 171.

As an example, the migration component 110 may thus flush to the memory 170, 171. Alternatively, a pointer to the second sub-set of source pages in which respective contents is stored is created. The migration component 110 may then move the pointer to the memory 170, 171 instead of moving the actual content. With a pointer, the source compute sled 131 may need to occupy the source memory for a longer time than when the actual content is moved to the memory 170, 171. However, time for processing all source pages may be reduced as compared to when the actual content is moved.

Action B080

The migration component 110 may select a third sub-set of source pages. The respective source status of each source page of the third sub-set is unmodified according to the source table 151.

Action B090

The migration component 110 may select a fourth sub-set of source pages. The respective source status of each source page of the fourth sub-set is unmodified according to the source table 151. The third sub-set of source pages is different from the fourth sub-set of source pages.

Action B100

The migration component 110 may set the target table 152 to indicate that a third sub-set of target pages is allocated in the further memory 175, 176, wherein the third sub-set of target pages is associated with the third sub-set of source pages. In this fashion, some unmodified pages are flushed to e.g. the memory sled 177 and/or they may be retrieved by the swap device thanks to a pointer as explained above.

Action B110

The migration component 110 may set the target table 152 to indicate that a fourth sub-set of target pages is allocated in the target local memory 142. The fourth sub-set of target pages is associated with the fourth sub-set of source pages.

Action B120

The migration component 110 may migrate the respective content stored in the fourth sub-set of source pages to the first sub-set of target pages. Sometimes, the migration component 110 may migrate the respective content stored in the fourth sub-set of source pages to the third sub-set of target pages.

With the embodiments of actions B080 to B120, it may be achieved that only some unmodified pages are migrated, i.e. those unmodified pages that are swapped out or retrievable via the swap device need not be migrated.

Figure 5:
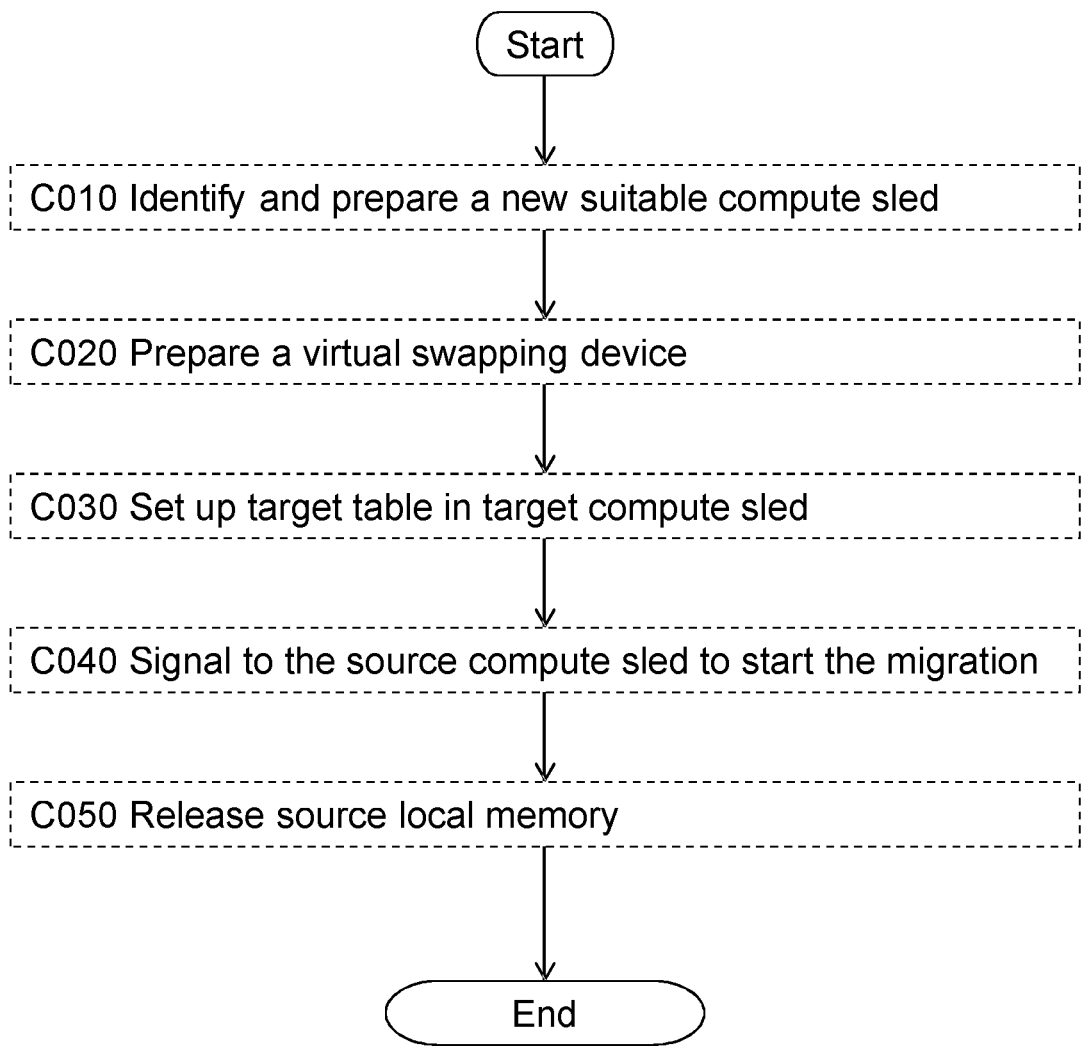
FIG. 5 is a further exemplifying flowchart illustrating embodiments of the method in an exemplifying data center managing module.

In FIG. 5, a schematic flowchart of exemplifying methods in the DCM 120 is shown. Accordingly, the DCM 120 performs a method for initiating and/or facilitating migration of the application 160 from the source compute sled 131 to the target compute sled 132.

One or more of the following actions may be performed in any suitable order.

Action C010

The DCM 120 may identify and prepare the target compute sled 132.

Action C020

The DCM 120 may prepare the virtual swap device 173. For example, the virtual swap device 173 may be configured with a pointer to the source local memory 141 or a remote memory page.

Action C030

The DCM 120 may set up the target table 152 in the target compute sled 132. The DCM 120 may for example initiate the target table 152 to indicate status unknown for all target pages of the target local memory 142. In some example, the migration component 110 may initiate the target table 152 to indicate status unknown for all target pages of the target local memory 142.

Action C040

The DCM 120 may further signal to the source compute sled 131 to start the migration. This action may be similar to action A050 and/or A060 and/or B010 above.

Action C050

The DCM 120 may release the source local memory 141, i.e. send a command instructing the source compute sled 131 to release memory associated with the application 160. This action may be similar to action A140 and/or A150.

Figure 6:
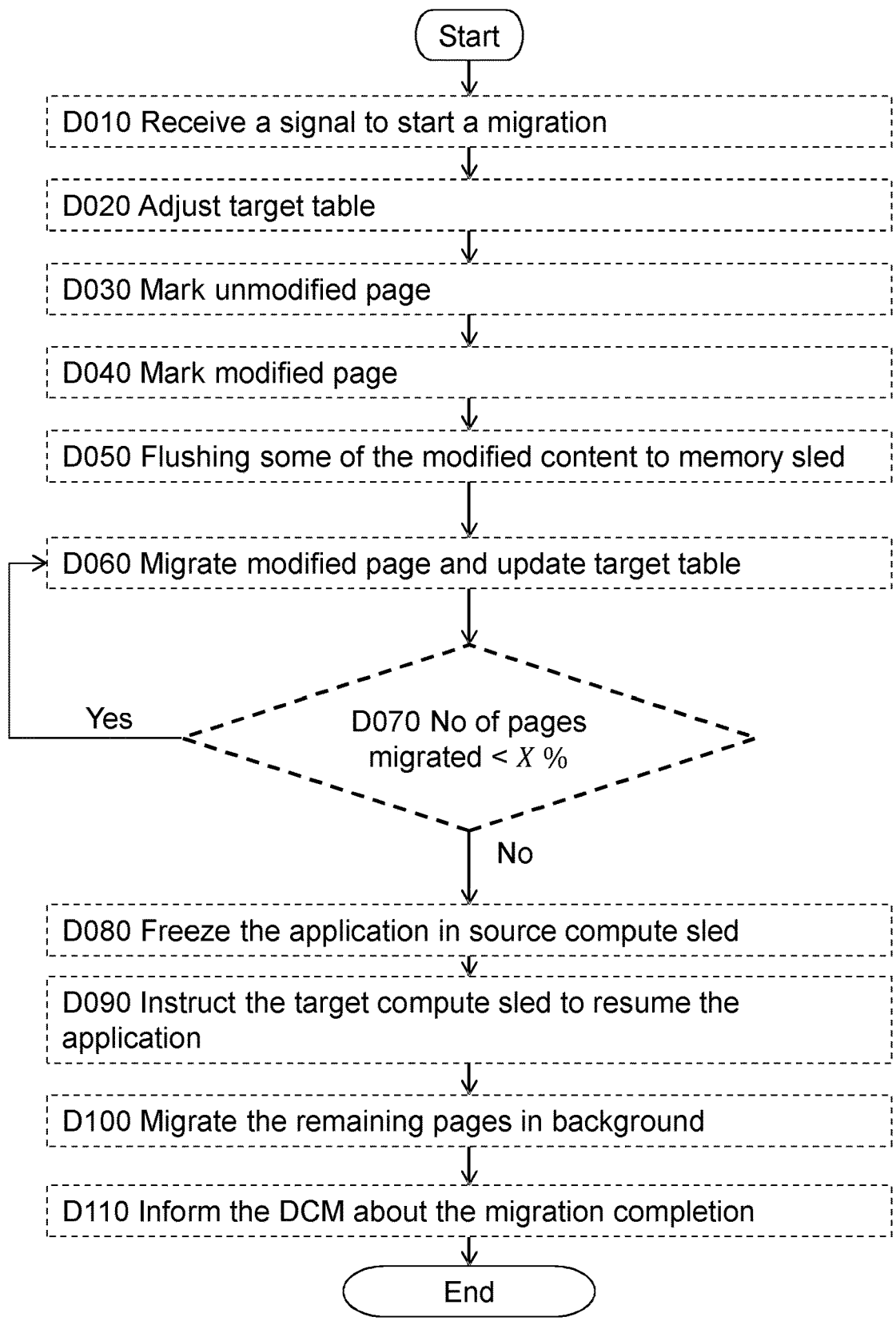
FIG. 6 is a yet further exemplifying flowchart illustrating further embodiments of the method in the migration component.

In FIG. 6, a further schematic flowchart of a further exemplifying method in the migration component 110 is shown. Accordingly, the migration component 110 performs a further exemplifying method for migrating the application 160 from the source compute sled 131 to the target compute sled 132.

One or more of the following actions may be performed in any suitable order.

Action D010

The migration component 110 may receive a signal to start a migration.

When the migration is initiated for an application running in e.g. the target compute sled 131, the DCM 120 identifies and prepares a new suitable compute sled, such as the target compute sled 132, to which the application 160 may be migrated.

If applicable, the DCM 120 may also configure a LMMU 182, located in the target compute sled 132, to access the part of the application's pages that reside in remote memory, such as in the memory 170, comprised in the memory sled 172. If required, the DCM 120 may prepare the virtual swap devices 173, 178 to load certain pages from the source compute sled. The certain pages may have status modified or unmodified.

The DCM 120 may inform, e.g. the migration component 110, about the source and target compute sleds 131, 132, e.g. their locations in terms of identity, and signals to start migrating the contents of at least some of the pages of the source local memory to the target local memory. The migration component 110 may schedule the migration of pages in any required fashion. Also, a target table may be created in the target compute sled 132 and the migration component 110 may initialize all the page status with 'UNKNOWN'.

This action may be similar to aforementioned actions A010, A020, A030, A050, A060 and the like.

Action D020

The migration component 110 may adjust the target table 152 to size of the target local memory 142. Then, the migration component 110 may initiate transfer of contents on source pages of the source local memory, preferably content stored on pages whose status is modified. This may mean that transfer of content of these pages may continue in the background while the migration component 110 continues with one or more further actions as below.

The migration component 110 may copy the source table to the target table, i.e. information in source table is copied to the target table, while making one or more of the following changes before copying.

Action D030

The migration component 110 may mark some of the unmodified pages as swapped out to remote memory. These pages have the same content in the remote memory and do not need to be copied. Preferably, these pages are not frequently used, e.g. according to a respective utility indication for each page.

Action D040

The migration component 110 may mark some of the modified pages as swapped out to the special swap device(s). These pages may be copied in a later stage, e.g. even after the application 160 may have been resumed in the target compute sled 132.

Action D050

The migration component 110 may flush some of the modified content to the memory sled 172, 177 to reduce time for copy of pages after the application 160 may have been resumed in the target compute sled 132.

Action D060

The migration component 110 may use the source table and may check the status of each page in the source local memory. If the status of the source page is modified and has a value of MODIFIED, then the migration component 110 may migrate the contents from the source local memory to the target local memory and may update the corresponding entry in the target table with the status being MODIFIED, i.e. dirty. If it is possible to identify most used modified pages, these pages are transferred first.

A desired time before resumption of the application 160 in the target compute sled 132 can be chosen by allowing resumption after a subset of source pages has been migrated. Then, the application may be stopped in the source compute sled 131 and resumed in the target compute sled 132 after updating the tables as described herein.

The remaining pages are loaded as needed, e.g. on demand, from the source compute sled or remote memory or from the source compute sled via the virtual swap device, while the migration component 110 is updating the pages in the background. The reference, such as one or more pointers, to the source pages may be kept in the swap special device.

Action D070

The migration component 110 may check how many pages that have been migrated. For example, the migration component 110 may check if less than X % of a total number of source pages have been migrated, and if so migration of pages shall continue. That is, it may not yet be suitable to resume the application 160 in the target compute sled 132. It may not be suitable since if it would be resumed already when less than X % have been migrated, there would be many so called page faults, leading to delay or even interruption in the execution of the application 160.

As an example, the check of how many pages that have been migrated may also be determined in relation to an absolute value, such as Y number of pages, where Y not necessarily need to be related to the total number of source pages.

Action D080

When the migration component 110 has determined that the application 160 may be resumed in the target compute sled 132, the migration component 110 may freeze the application 160 in the source compute sled, i.e. execution thereof in the source compute sled may be stopped, such as halted or the like.

Action D090

Following action D080, the migration component 110 may instruct the target compute sled to resume the application 160. Alternatively, the migration component may instruct the DCM 120 that the application 160 now may be resumed in the target compute sled 132. The DCM 120 may then in its turn instruct the target compute sled 132 to resume the application 160. Hence, the target compute sled 132 is instructed to resume the application 160 directly or indirectly on initiative of the migration component 110.

Action D100

When the application 160 has been resumed in the target compute sled 132, the migration component 110 may continue to migrate any content remaining on the source pages in the source compute sled 131.

Action D110

As one of one or more final actions, the migration component 110 may inform the DCM 120 about that the migration is completed, i.e. all content of the source pages have been migrated to the target compute sled 132. This action may of course be performed when the source local memory has no content that needs to be migrated.

Furthermore, the migration component 110 may instruct the source compute sled 131 to disassociates the source local memory from the application 160 and reset the source table, e.g. with values UNKNOWN. The migration component 110 may perform this indirectly via the DCM 120 similarly to action D080 and/or D090 above.

With embodiment in which the application 160 is resumed in the target compute sled 132 before the total number of source pages, i.e. contents thereof, has been migrated, a faster switchover, or migration, to the target compute sled 132 is achieved as compared to when awaiting the contents of the total number of source pages to be migrated. In these embodiments, migration of contents of source pages continues in the background and/or on demand when a page is requested in the target local memory.

With embodiments in which contents of some source pages, e.g. modified and/or unmodified, is moved, or migrated, to the memory sled a time required to keep the source compute sled available may need to be reduced as compared to keeping those source pages, or rather contents thereof, in the source compute sled 131.

Figure 7:
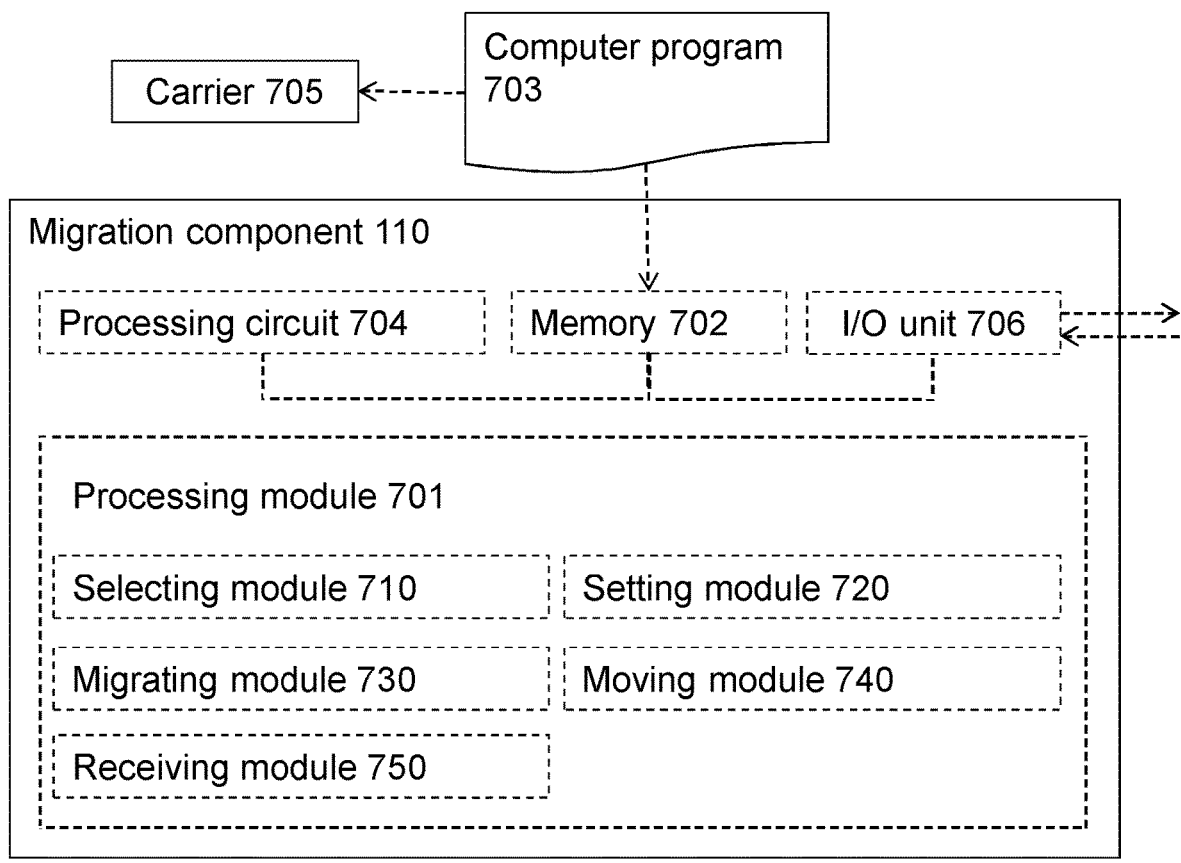
FIG. 7 is a block diagram illustrating an exemplifying migration component.

With reference to FIG. 7, a schematic block diagram of embodiments of the migration component 110 of FIG. 2 is shown.

The migration component 110 may comprise a processing module 701, such as a means for performing the methods described herein. The means may be embodied in the form of one or more hardware modules and/or one or more software modules The migration component 110 may further comprise a memory 702. The memory may comprise, such as contain or store, instructions, e.g. in the form of a computer program 703, which may comprise computer readable code units.

According to some embodiments herein, the migration component 110 and/or the processing module 701 comprises a processing circuit 704 as an exemplifying hardware module. Accordingly, the processing module 701 may be embodied in the form of, or 'realized by', the processing circuit 704. The instructions may be executable by the processing circuit 704, whereby the migration component 110 is operative to perform the methods of FIG. 3 and/or FIG. 4 and/or FIG. 6. As another example, the instructions, when executed by the migration component 110 and/or the processing circuit 704, may cause the migration component 110 to perform the method according to FIG. 3 and/or FIG. 4 and/or FIG. 6.

In view of the above, in one example, there is provided a migration component 110 for migrating an application 160 executing in a source compute sled 131 to a target compute sled 132. As mentioned, the application is associated with data stored in a set of source pages of a source local memory 141 of the source compute sled 131. The data comprises a respective content stored in a respective source page of the source local memory 141. At least a portion of the data is stored in a set of target pages of a target local memory 142 of the target compute sled when the application executes in the target compute sled 132 after the migration of the application. A memory 170, 171 is capable of supporting the migration of the application 160. The memory 170, 171 is excluded from the source and target compute sleds 131, 132. Again, the memory 702 contains the instructions executable by said processing circuit 704 whereby the migration component 110 is operative for:

selecting a first sub-set of source pages, wherein a respective source status of each source page of the first sub-set is modified according to a source table 151 of the source compute sled 131, wherein the source table 151 indicates the respective source status of each source page, wherein the respective source status for any source page indicates that said any source page is one of modified and unmodified, setting a target table 152 of the target compute sled 132 to indicate that a first sub-set of target pages are modified, wherein the first sub-set of target pages is associated with the first sub-set of source pages, wherein the target table indicates a respective target status of each target page of the target local memory, wherein the respective target status for any target page indicates that said any target page is one of modified and unmodified, migrating the respective content stored in the first sub-set of source pages to the first sub-set of target pages, selecting a second sub-set of source pages, wherein the respective source status of each source page of the second sub-set is modified according to the source table 151, wherein the first sub-set of source pages is different from the second sub-set of source pages, setting the target table 152 to indicate that a second sub-set of target pages is allocated in the memory 170, 171, wherein the second sub-set of target pages is associated with the second sub-set of source pages, wherein the first sub-set of target pages is different from the second sub-set of target pages, and moving the respective content stored in the second sub-set of source pages to the memory 170, 171.

FIG. 7 further illustrates a carrier 705, or program carrier, which comprises the computer program 703 as described directly above. The carrier 705 may be one of an electronic signal, an optical signal, a radio signal and a computer readable medium.

In further embodiments, the migration component 110 and/or the processing module 701 may comprise one or more of a selecting module 710, a setting module 720, a migrating module 730, a moving module 740, and a receiving module 750 as exemplifying hardware modules. In other examples, one or more of the aforementioned exemplifying hardware modules may be implemented as one or more software modules.

Moreover, the migration component 110 and/or the processing module 701 comprises an Input/Output unit 706, which may be exemplified by the receiving module and/or a sending module when applicable.

Accordingly, the migration component 110 is configured for migrating an application 160 executing in a source compute sled 131 to a target compute sled 132.

As mentioned, the application is associated with data stored in a set of source pages of a source local memory 141 of the source compute sled 131. The data comprises a respective content stored in a respective source page of the source local memory 141, wherein at least a portion of the data is stored in a set of target pages of a target local memory 142 of the target compute sled when the application executes in the target compute sled 132 after the migration of the application, wherein a memory 170, 171 is capable of supporting the migration of the application 160. The memory 170, 171 is excluded from the source and target compute sleds 131, 132.

Therefore, according to the various embodiments described above, the migration component 110 and/or the processing module 701 and/or the selecting module 710 is configured for selecting a first sub-set of source pages, wherein a respective source status of each source page of the first sub-set is modified according to a source table 151 of the source compute sled 131. The source table 151 indicates the respective source status of each source page. The respective source status for any source page indicates that said any source page is one of modified and unmodified.

The migration component 110 and/or the processing module 701 and/or the setting module 720 is configured for setting a target table 152 of the target compute sled 132 to indicate that a first sub-set of target pages are modified. The first sub-set of target pages is associated with the first sub-set of source pages. The target table indicates a respective target status of each target page of the target local memory. The respective target status for any target page indicates that said any target page is one of modified and unmodified.

Moreover, the migration component 110 and/or the processing module 701 and/or the migrating module 730 is configured for migrating the respective content stored in the first sub-set of source pages to the first sub-set of target pages.

The migration component 110 and/or the processing module 701 and/or the selecting module 710, or a further selecting module (not shown), is configured for selecting a second sub-set of source pages. The respective source status of each source page of the second sub-set is modified according to the source table 151. The first sub-set of source pages is different from the second sub-set of source pages.

Furthermore, the migration component 110 and/or the processing module 701 and/or the setting module 720, or a further setting module (not shown), is configured for setting the target table 152 to indicate that a second sub-set of target pages is allocated in the memory 170, 171. The second sub-set of target pages is associated with the second sub-set of source pages. The first sub-set of target pages is different from the second sub-set of target pages.

The migration component 110 and/or the processing module 701 and/or the moving module 740 is configured for moving the respective content stored in the second sub-set of source pages to the memory 170, 171.

The memory 170, 171 may be comprised in at least one of a memory sled 172 and a virtual swap device 173.

A further memory 175, 176 may be capable of supporting the migration of the application 160. The further memory 175, 176 may be excluded from the source and target compute sleds 131, 132.

The migration component 110 and/or the processing module 701 and/or the selecting module 710, or a yet further selecting module (not shown), may be configured for selecting a third sub-set of source pages. The respective source status of each source page of the third sub-set is unmodified according to the source table 151.

The migration component 110 and/or the processing module 701 and/or the selecting module 710 may be configured for selecting a fourth sub-set of source pages. The respective source status of each source page of the fourth sub-set is unmodified according to the source table 151. The third sub-set of source pages is different from the fourth sub-set of source pages.

The migration component 110 and/or the processing module 701 and/or the setting module 720 may be configured for setting the target table 152 to indicate that a third sub-set of target pages is allocated in the further memory 175, 176. The third sub-set of target pages is associated with the third sub-set of source pages.

The migration component 110 and/or the processing module 701 and/or the setting module 720 may be configured for setting the target table 152 to indicate that a fourth sub-set of target pages is allocated in the target local memory 142. The fourth sub-set of target pages is associated with the fourth sub-set of source pages.

The migration component 110 and/or the processing module 701 and/or the migrating module 730 may be configured for migrating the respective content stored in the fourth sub-set of source pages to the first sub-set of target pages.

The selecting of the first sub-set of source pages may be based on the set of utility indications, and/or the selecting of the second sub-set of source pages is based on the set of utility indications, and/or the selecting of the third sub-set of source pages is based on the set of utility indications, and/or the selecting of the fourth sub-set of source pages is based on the set of utility indications.

The further memory 175, 176 may be comprised in at least one of a further memory sled 177 and a further virtual swap device 178.

The further memory 175 is the memory 170, and/or the further memory sled 176 may be the memory sled 171, and/or the further virtual swap device 177 may be the virtual swap device 172.

Each source page may have a respective utility indication relating to at least one of access frequency, latency and memory type, wherein a set of utility indications comprises the respective utility indication for each source page.

The migration component 110 and/or the processing module 701 and/or the receiving module 750 may be configured for receiving an instruction from a data center managing module 120 to migrate the application to the target compute sled 132.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on cloud system, which may comprise a set of server machines.

As used herein, the term "module" may refer to one or more functional modules, each of which may be implemented as one or more hardware modules and/or one or more software modules and/or a combined software/hardware module in a node. In some examples, the module may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software function, a software engine, an executable binary software file or the like.

The terms "processing module" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the terms "first", "second", "third" etc. may have been used merely to distinguish features, apparatuses, elements, units, or the like from one another unless otherwise evident from the context.

As used herein, the term "subsequent action" may refer to that one action is performed after a preceding action, while additional actions may or may not be performed before said one action, but after the preceding action.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method comprising:
performing by a migration component, for migrating an application executing in a source compute sled to a target compute sled, wherein the application is associated with data stored in a set of source pages of a source local memory of the source compute sled, wherein the data comprises a respective content stored in a respective source page of the source local memory, wherein at least a portion of the data is stored in a set of target pages of a target local memory of the target compute sled when the application executes in the target compute sled after the migration of the application, wherein a memory is capable of supporting the migration of the application, and wherein the memory is excluded from the source and target compute sleds;
selecting a first sub-set of source pages, wherein a respective source status of each source page of the first sub-set is modified according to a source table of the source compute sled, wherein the source table indicates the respective source status of each source page, wherein the respective source status for any source page indicates that said any source page is modified or unmodified, wherein each source page has a respective utility indication relating to at least one of access frequency, latency, and memory type;

setting a target table of the target compute sled to indicate that a first sub-set of target pages are modified, wherein the first sub-set of target pages is associated with the first sub-set of source pages, wherein the target table indicates a respective target status of each target page of the target local memory, wherein the respective target status for any target page indicates that said any target page is modified or unmodified;

migrating the respective content stored in the first sub-set of source pages to the first sub-set of target pages;

selecting a second sub-set of source pages, wherein the respective source status of each source page of the second sub-set is modified according to the source table, wherein the first sub-set of source pages is different from the second sub-set of source pages;

setting the target table to indicate that a second sub-set of target pages is allocated in the memory, wherein the second sub-set of target pages is associated with the second sub-set of source pages, wherein the first sub-set of target pages is different from the second sub-set of target pages; and moving the respective content stored in the second sub-set of source pages to the memory.

2. The method according to claim 1, wherein the memory is comprised in at least one of a memory sled and a virtual swap device.

3. The method according to claim 1, wherein a further memory is capable of supporting the migration of the application, wherein the further memory is excluded from the source and target compute sleds, the method further comprising:

selecting a third sub-set of source pages, wherein the respective source status of each source page of the third sub-set is unmodified according to the source table;

selecting a fourth sub-set of source pages, wherein the respective source status of each source page of the fourth sub-set is unmodified according to the source table, wherein the third sub-set of source pages is different from the fourth sub-set of source pages;

setting the target table to indicate that a third sub-set of target pages is allocated in the further memory, wherein the third sub-set of target pages is associated with the third sub-set of source pages;

setting the target table to indicate that a fourth sub-set of target pages is allocated in the target local memory, wherein the fourth sub-set of target pages is associated with the fourth sub-set of source pages; and migrating the respective content stored in the fourth sub-set of source pages to the first sub-set of target pages.

4. The method according to claim 3, wherein the further memory is comprised in at least one of a further memory sled and a further virtual swap device.

5. The method according to claim 4, further comprising at least one of:

wherein the further memory is part of the memory;

wherein the further memory sled is part of the memory sled; and wherein the further virtual swap device is part of the virtual swap device.

6. The method according to claim 3, wherein a set of utility indications comprises the respective utility indication for each source page.

7. The method according to claim 6, further comprising at least one of:

wherein the selecting of the first sub-set of source pages is based on the set of utility indications;

wherein the selecting of the second sub-set of source pages is based on the set of utility indications;

wherein the selecting of the third sub-set of source pages is based on the set of utility indications; and wherein the selecting of the fourth sub-set of source pages is based on the set of utility indications.

8. The method according to claim 1, further comprising:

receiving an instruction from a data center managing device to migrate the application to the target compute sled.

9. A non-transitory machine-readable storage medium comprising instructions which, when executed by a processing circuit of a migration component, cause the migration component to perform operations comprising:

performing by the migration component, for migrating an application executing in a source compute sled to a target compute sled, wherein the application is associated with data stored in a set of source pages of a source local memory of the source compute sled, wherein the data comprises a respective content stored in a respective source page of the source local memory, wherein at least a portion of the data is stored in a set of target pages of a target local memory of the target compute sled when the application executes in the target compute sled after the migration of the application, wherein a memory is capable of supporting the migration of the application, and wherein the memory is excluded from the source and target compute sleds;

selecting a first sub-set of source pages, wherein a respective source status of each source page of the first sub-set is modified according to a source table of the source compute sled, wherein the source table indicates the respective source status of each source page, wherein the respective source status for any source page indicates that said any source page is modified or unmodified, wherein each source page has a respective utility indication relating to at least one of access frequency, latency, and memory type;

setting a target table of the target compute sled to indicate that a first sub-set of target pages are modified, wherein the first sub-set of target pages is associated with the first sub-set of source pages, wherein the target table indicates a respective target status of each target page of the target local memory, wherein the respective target status for any target page indicates that said any target page is modified or unmodified;

migrating the respective content stored in the first sub-set of source pages to the first sub-set of target pages;

selecting a second sub-set of source pages, wherein the respective source status of each source page of the second sub-set is modified according to the source table, wherein the first sub-set of source pages is different from the second sub-set of source pages;

setting the target table to indicate that a second sub-set of target pages is allocated in the memory, wherein the second sub-set of target pages is associated with the second sub-set of source pages, wherein the first sub-set of target pages is different from the second sub-set of target pages; and moving the respective content stored in the second sub-set of source pages to the memory.

10. A migration component comprising:

a processing circuit; and a program memory containing instructions which, when executed by the processing circuit, cause the migration component to perform operations to:

perform migrating of an application executing in a source compute sled to a target compute sled, wherein the application is associated with data stored in a set of source pages of a source local memory of the source compute sled, wherein the data comprises a respective content stored in a respective source page of the source local memory, wherein at least a portion of the data is stored in a set of target pages of a target local memory of the target compute sled when the application executes in the target compute sled after the migration of the application, wherein a memory is capable of supporting the migration of the application, and wherein the memory is excluded from the source and target compute sleds;

select a first sub-set of source pages, wherein a respective source status of each source page of the first sub-set is modified according to a source table of the source compute sled, wherein the source table indicates the respective source status of each source page, wherein the respective source status for any source page indicates that said any source page is modified or unmodified, wherein each source page has a respective utility indication relating to at least one of access frequency, latency, and memory type;

set a target table of the target compute sled to indicate that a first sub-set of target pages are modified, wherein the first sub-set of target pages is associated with the first sub-set of source pages, wherein the target table indicates a respective target status of each target page of the target local memory, wherein the respective target status for any target page indicates that said any target page is modified or unmodified;

migrate the respective content stored in the first sub-set of source pages to the first sub-set of target pages;

select a second sub-set of source pages, wherein the respective source status of each source page of the second sub-set is modified according to the source table, wherein the first sub-set of source pages is different from the second sub-set of source pages;

set the target table to indicate that a second sub-set of target pages is allocated in the memory, wherein the second sub-set of target pages is associated with the second sub-set of source pages, wherein the first sub-set of target pages is different from the second sub-set of target pages; and move the respective content stored in the second sub-set of source pages to the memory.

11. The migration component according to claim 10, wherein the memory is comprised in at least one of a memory sled and a virtual swap device.

12. The migration component according to claim 10, wherein a further memory is capable of supporting the migration of the application, wherein the further memory is excluded from the source and target compute sleds, the migration component further performs operations to:

select a third sub-set of source pages, wherein the respective source status of each source page of the third sub-set is unmodified according to the source table;

select a fourth sub-set of source pages, wherein the respective source status of each source page of the fourth sub-set is unmodified according to the source table, wherein the third sub-set of source pages is different from the fourth sub-set of source pages;

set the target table to indicate that a third sub-set of target pages is allocated in the further memory, wherein the third sub-set of target pages is associated with the third sub-set of source pages;

set the target table to indicate that a fourth sub-set of target pages is allocated in the target local memory, wherein the fourth sub-set of target pages is associated with the fourth sub-set of source pages; and migrate the respective content stored in the fourth sub-set of source pages to the first sub-set of target pages.

13. The migration component according to claim 12, wherein the further memory is comprised in at least one of a further memory sled and a further virtual swap device.

14. The migration component according to claim 13, further comprising at least one of:

wherein the further memory is part of the memory;

wherein the further memory sled is part of the memory sled; and wherein the further virtual swap device is part of the virtual swap device.

15. The migration component according to claim 12, wherein a set of utility indications comprises the respective utility indication for each source page.

16. The migration component according to claim 15, further comprising at least one of:

wherein the selecting of the first sub-set of source pages is based on the set of utility indications;

wherein the selecting of the second sub-set of source pages is based on the set of utility indications;

wherein the selecting of the third sub-set of source pages is based on the set of utility indications; and wherein the selecting of the fourth sub-set of source pages is based on the set of utility indications.

17. The migration component according to claim 10, wherein the migration component to receive an instruction from a data center managing device to migrate the application to the target compute sled.

* * * * *